(12) United States Patent
Blankenship

(10) Patent No.: US 6,998,574 B2
(45) Date of Patent: Feb. 14, 2006

(54) WELDING TORCH WITH PLASMA ASSIST

(75) Inventor: George D. Blankenship, Chardon, OH (US)

(73) Assignee: Linclon Global, Inc., Monterey Park, CA (US)

( * ) Notice: Subject to any disclaimer, the term of this patent is extended or adjusted under 35 U.S.C. 154(b) by 26 days.

(21) Appl. No.: 10/810,872

(22) Filed: Mar. 29, 2004

(65) Prior Publication Data

US 2005/0211685 A1    Sep. 29, 2005

(51) Int. Cl.
    *B23K 9/06*   (2006.01)
(52) U.S. Cl. ..................... 219/130.4; 219/74
(58) Field of Classification Search .................. 219/74, 219/75, 130.4, 137 PS
    See application file for complete search history.

(56) References Cited

U.S. PATENT DOCUMENTS

| | | | | |
|---|---|---|---|---|
| 3,309,564 A | * | 3/1967 | Poulsen ........................ | 219/75 |
| 3,612,807 A | * | 10/1971 | Liefkens et al. ............... | 219/75 |
| 4,174,477 A | * | 11/1979 | Essers et al. .................. | 219/75 |
| 4,234,779 A | * | 11/1980 | Willems ....................... | 219/74 |
| 4,767,907 A | * | 8/1988 | Otani et al. ............ | 219/121.56 |
| 5,117,088 A | | 5/1992 | Stava | |
| 6,753,497 B1 | * | 6/2004 | Matus et al. ........... | 219/121.46 |

OTHER PUBLICATIONS

*Cold Plasma Reactor with Dielectric Barrier Discharge* P. Opalinska Industrial Chemistry Research Institute of Poland.
*Dielectric-Barrier Discharges Principle and Applications* French Journal of Physics (1997).

* cited by examiner

Primary Examiner—Clifford C. Shaw
(74) Attorney, Agent, or Firm—Fay, Sharpe, Fagan, Minnich & McKee, LLP

(57) ABSTRACT

An electric arc welding torch having a central conductive contact tube for electrical contact between a power source and a welding wire moving through the contact tube toward a workpiece, a conductive sleeve concentric with the tube to define an annular chamber between the tube and the sleeve, a first dielectric barrier sleeve fixed on the conductive sleeve and a second dielectric sleeve on the tube where the dielectric sleeves are spaced from each other to define an annular gas passage extending around the moving wire and terminals to connect a high frequency power source between the tube and the conductive sleeve to create a dielectric barrier discharge plasma issuing from the gas passage. This torch is used in a novel welding method where the shielding gas envelope around the arc is a plasma.

63 Claims, 1 Drawing Sheet

WELDING TORCH WITH PLASMA ASSIST

The present invention relates to the art of electric arc welding and more particularly to an electric arc welding torch having a plasma assist to enhance the quality of the welding arc.

INCORPORATION BY REFERENCE

The present invention relates to an electric arc welding torch wherein the arc shielding gas is directed through a gap or passageway which creates a dielectric barrier discharge plasma formed from the shielding gas forced through the torch. Dielectric barrier discharge creation of a cold plasma is well known in the scientific community. This concept is disclosed in many publications. To provide background information on this electric phenomenon, two articles are incorporated by reference herein. The articles are *Cold Plasma Reactor with Dielectric Barrier Discharge* by T. Opalinska from the Industrial Chemistry Research Institute of Poland and *Dielectric-Barrier Discharges Principle and Applications* in the French Journal of Physics (1997). These two articles provide technical information regarding the creation of a plasma by dielectric discharge as employed in the present invention. To create such plasma, it is necessary to expose a gas to a high voltage, high frequency signal applied across electrodes separated by a dielectric boundary. Many high frequency power sources can be used for creating such plasma. A forced resonant power source as show in Stava, U.S. Pat. No. 5,117,088 is incorporated by reference herein as a representative power source that can be used in practicing the present invention.

BACKGROUND OF INVENTION

Electric arc welding torches normally comprise a central contact tube through which a welding wire is driven by feed rolls toward a workpiece. Electric energy is directed to the moving welding wire by way of the contact tube which is connected in a series circuit with the grounded workpiece. Around the contact tube a passageway is normally provided for directing a shielding gas such as argon, carbon dioxide or combinations of these two shielding gases. During the arc welding process, where an arc is created between the wire and the workpiece, a shielding gas from the torch surrounds the arc and protects the welding process from hydrogen and other contaminants. The welding wire may be a solid metal (GMAW) or a cored wire like those used in flux cored arc welding (FCAW). In TIG welding, the electrode is tungsten and is not consumed by the welding process which employs an arc between the fixed electrode and the workpiece. A filler wire is directed to the arc for the purposes of welding. Again, a shielding gas surrounds the arc for protecting the molten metal as it is deposited onto the workpiece. The quality of the arc is affected by the integrity of surrounding shielding gas. The present invention relates to an improvement in this general welding procedure whereby the welding arc is enhanced beyond that obtained by merely using a standard envelope of shielding gas.

THE INVENTION

A dielectric barrier discharge plasma is used to enhance the quality of the welding arc beyond that obtainable with a standard shielding gas. As is known in physics, a dielectric barrier discharge is characterized by high voltage, high frequency signal applied across two conductive surfaces separated by dielectric boundaries. Gases such as a shielding gas between the dielectric boundary surfaces is uniformly ionized by the dielectric barrier discharge process. The results of this ionization is a non-thermal or "cold" plasma that is formed at atmospheric pressures and has the characteristics of a plasma as opposed to a mere stream of shielding gas. The present invention is directed to the concept of using the dielectric barrier discharge freely in conjunction with an electric arc welding torch. A radio frequency voltage source is used to impose a high voltage, high frequency signal across the gap between the inner contact tip or tube and a conductive outer ring, housing member or element. The tip and outer element are separated by an internal, annular dielectric boundary within the torch itself. Shielding gas is forced through the gap and is ionized by the resulting high frequency electric field within the passageway through which the gas moves. Alternatively, the radio frequency signal, as used in the preferred embodiment of the invention, may be replaced with a very high speed pulse of high voltage electricity characterized by a very fast rising and falling edge of the pulse. The pulse time in this power source is preferably less than 1.0 ms. The dielectric insulators or barriers in the torch are constructed of a ceramic, such as alumina or boron nitride, a glass such as borosilicate or lime glass or a dielectric polymer, such as Teflon. The uniformity of the cold plasma discharge can be increased by making the conductive surfaces on both sides of the shielding gas passage from a fine wire mesh, as opposed to a solid metal electrode. The welding power source may be a constant voltage, constant current, constant power or waveform control type. The plurality of the welding current can be DC positive, DC negative or AC. The consumable wire passing through the torch is preferably a solid wire, like that used in GMAW welding or a cored wire like used in FCAW welding. Similarly, the torch can be constructed for GTAW welding, where a non-consumable electrode is used, such as TIG welding. The plasma issuing from the shielding gas passageway of the torch is an ionized gas stream from a confined dielectric barrier discharge chamber and is a cold plasma discharge that is created in the torch. The shielding gas used for creating the plasma may include fractions of argon, helium, neon, xenon, krypton, carbon dioxide, hydrogen, nitrogen, nitric oxide and other gases. The high voltage signal applied across the conductors defining the shielding gas passageway of the torch has the desired characteristics for creating a dielectric barrier discharge plasma. Generally the high voltage signal across the dielectric passageway has a frequency between 0.5–1,000 kHz. The typical electrically driven plasma power source has about 200 kHz. The applied voltage is in the range of 2–40 kV with a typical value of generally 6,000 Vrms. The plasma gap through which the shielding gas is passed for ionization into a plasma has a width generally in the range of 0.2–3.0 cm. The pressure of the gas forced through the dielectric gap can vary to provide the necessary flow around the electrode arc. This pressure is typically about 800 torr and can be as high as about 3500 torr. To accomplish the required electrical parameters, the power source driving the high frequency voltage in the plasma gap can be of various types. For instance, the driving force can be an oscillator constructed using solid state electronic devices, such as IGBTs or MOSFETS. Many well known arrangements can produce the desired signals. The preferred arrangement is a series resonant tank circuit composed of an inductor and capacitor that is forced to resonant, as taught by Stava, U.S. Pat. No. 5,117,088. Other power sources that have been used are hard switched square wave signal power sources having a frequency in the general range of 20–80 kHz. The high frequency plasma creating signal can use a spark gap device, a vacuum tube device such as high power triode, or a microwave tube device, such as magnatron or klystron. The dielectric discharge becomes more uniform at higher frequencies, but the expense of such drive devices can become cost prohibitive. Of course, a fast pulsing power source using a MOSFET or thyratron tube can be used to produce a signal suitable for a dielectric barrier discharge in a torch constructed in accordance with the invention. To be effective, the pulse must have a very short duration and a very fast rise time and fall time.

The advantage of using a dielectric barrier discharge for the shielding gas of an electric arc welding torch is improved arc starting, improved arc stability and increased cleaning of the welding workpiece to remove contaminants and coatings during the welding operation. All of these advantages are obtained by use of the present invention. The particular power source employed in the invention has the characteristics to create the necessary dielectric plasma, but the specific driving source is not a part of the invention. The invention relates merely to the unique, novel electric arc welding torch using a plasma, such as a plasma created by a dielectric barrier discharge.

In accordance with the present invention there is provided an electric arc welding torch comprising a housing having a central conductive contact tip or tube for electrical contact between a power source and a welding wire moving through the contact tube toward a workpiece. A conductive sleeve concentric with the contact tip is used to define an annular chamber between the tip and the outer conductive sleeve, with a first dielectric barrier sleeve fixed on the conductive sleeve and a second dielectric sleeve on the tip or tube. The dielectric sleeves are spaced from each other to define an annular gas passageway extending around, and parallel with, the direction the wire is moving. Terminals are used to connect a high voltage, high frequency power source between the tip or tube and the conductive sleeve to create a dielectric barrier discharge plasma issuing from the gas passage. The frequency of the power source is in the general range of 500 Hz to 2,000 MHz. A preferred frequency is generally greater than 18 kHz. The voltage of the power source is preferably in the general range of 1–40 kV. The gap width for the shielding gas is in the general range of 0.2–3.0 cm. The material of the dielectric for use is selected from the class consisting of ceramic, glass and polymer. It is preferably ceramic.

In accordance with another aspect of the present invention there is provided a method of electric arc welding comprising providing a welding electrode, such as a welding wire, and creating an arc between the welding wire and workpiece. The invention involves surrounding the electric arc with a plasma, which plasma is preferably created by an electric barrier discharge. The gas used for the discharge plasma is the standard shielding gas flowing through the nozzle and around the electric arc defining the welding operation.

The primary object of the present invention is the provision of an electric arc welding torch wherein the shielding gas is passed through a chamber and is ionized by the dielectric barrier discharge phenomenon, so that the electric arc is protected by a plasma of the shielding gas.

Still a further object of the present invention is the provision of a method for using the torch defined above, which method employs a surrounding shielding gas plasma for protecting the electric arc of an electric arc welding procedure.

Yet another object of the present invention is the provision of a torch and method, as defined above, which torch and method improve the starting of the arc in the welding process.

Still another object of the present invention is the provision of a torch and method, as defined above, which torch and method improve the arc stability of the electric arc used in the welding process.

Yet a further object of the present invention is the provision of a torch and method, as defined above, which torch and method clean the welding workpiece to remove contaminants and coatings to improve the quality of the welding operation.

These and other objects and advantages will become apparent from the following description taken together with the accompanying drawings.

PREFERRED EMBODIMENT

Figure 1:
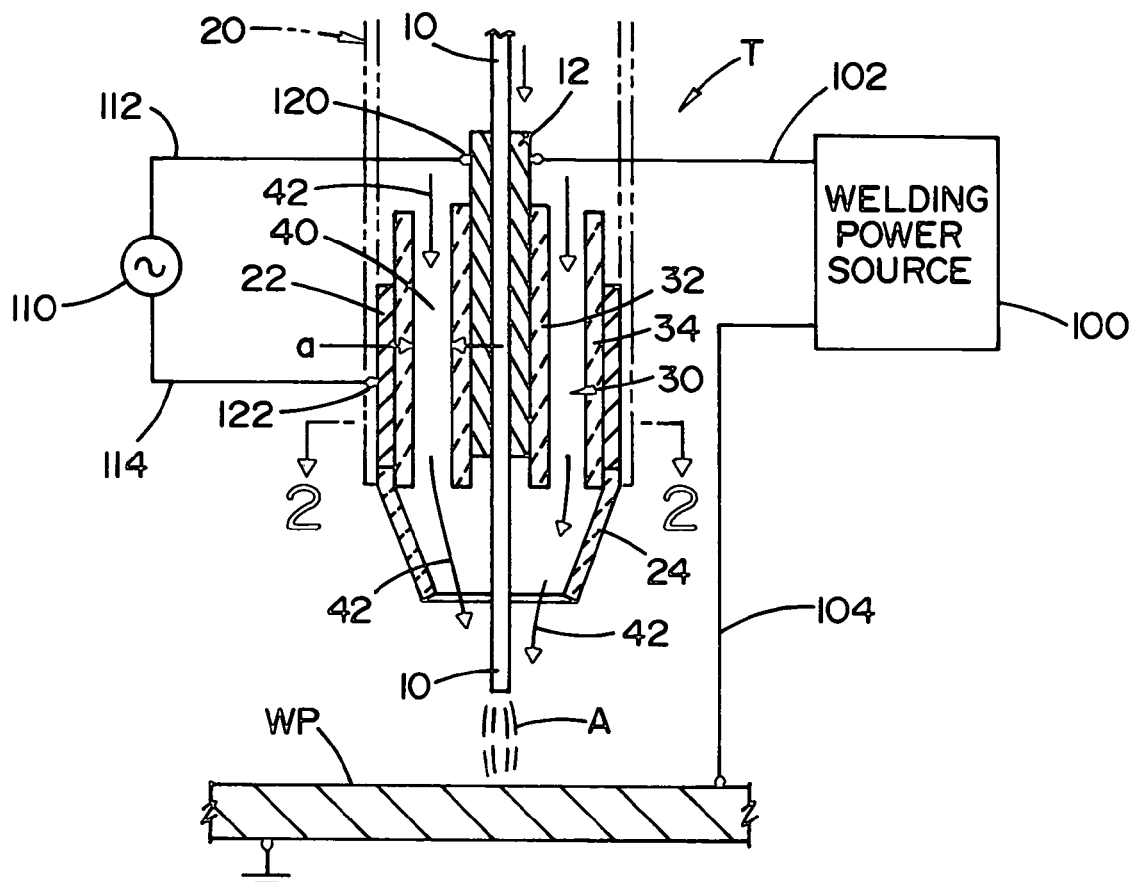
FIG. 1 is a cross-sectional view of a torch constructed in accordance with the present invention, together with a wiring diagram of the preferred embodiment; and, FIG. 2 is a cross-sectional view taken generally along line 2—2 of FIG. 1.
Figure 2:
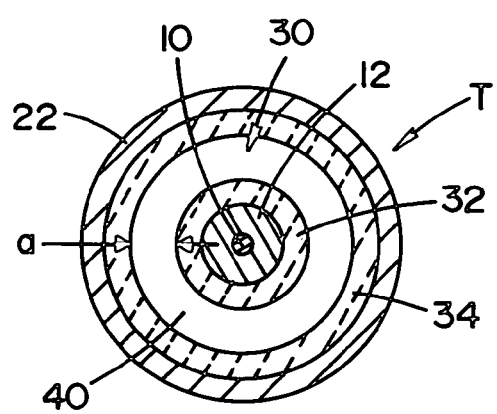

Referring now to the drawings wherein the showings are for the purpose of illustrating the preferred embodiment of the present invention only, and not for the purpose of limiting same, an electric arc welding torch T is a standard type of torch used in electric arc welding. In accordance with standard technology, wire 10 is driven through contact tip or tube 12 toward workpiece WP, where electrical power causes an arc A between wire 10 and workpiece WP. Contact tip or cylindrical tube 12 is used for electrical contact with moving wire 10. The torch has outer insulated housing 20 illustrated in phantom lines as surrounding a cylindrical conductor or electrode element 22 concentric with and surrounding tip or tube 12 and insulated cup 24 preferably formed of ceramic and extending from housing 20. Conductor 22 is in the form of a cylindrical sleeve defining an annular passageway 30 with tube 12. Passageway 30 includes dielectric sleeves 32, 34 formed from ceramic, glass or polymer to define gap 40 in passageway 30. Standard shielding gas flows through the gap, indicated by arrows 42. Gap 40 has a width a in the general range of 0.2–3.0 cm. Of course, torch T has standard structural features indicated by the phantom lines that are used to mount sleeve or cylindrical conductor 22 in concentric relationship with tip 12 and to provide electrical insulation to the surrounding environment. A standard power source 100 having output leads 102, 104 is used to create a welding operation between wire 10 and workpiece WP in accordance with the programmed operation of power source 100. As so far described, torch T is substantially the same as the standard electric arc welding torch except for the addition of the two concentric dielectric sleeves 32, 34 mounted on the outer surface of tip 12 an the inner surface of housing conductor 22. To apply a high voltage, high frequency signal across cylindrical conductors 12, 22, there is provided a high frequency, high voltage power source 110 having output leads 112, 114. These leads are attached to terminals 120, 122, respectively, to apply a high voltage, high frequency signal in the gap 40 between conductors 12, 22. In the illustrated torch, conductor 12 performs two functions. A separate conductor could be used for the inside conductor of gap 40 if desired. In one embodiment of the invention, the surface engaging dielectric sleeve 32, 34 is a fine wire mesh to increase the uniformity of plasma discharge within gap 40. Shielding gas 42 passes through passageway 30 defined by gap 40. In this way, shielding gas 42 is a cold plasma issuing from the torch and surrounding arc A. This improves starting of arc A, stability of arc A and causes a cleaning action of workpiece WP. Details of the dielectric and power sources are discussed in the introductory portion and are incorporated by reference in the description of the preferred embodiment. They need not be repeated.

Having thus defined the invention, the following is claimed:

1. An electric arc welding torch comprising a housing having a central conducive contact tube for electrical contact between a power source and a welding wire moving through the contact tube toward a workpiece in a given direction; a conductive sleeve concentric with said tube to define an annular chamber between said tube and said sleeve; a first dielectric barrier sleeve fixed on said conductive sleeve and a second dielectric sleeve on said tube, said dielectric sleeves spaced from each other to define an annular gas passage extending around and parallel with given direction of said moving wire and terminals to connect a high frequency power source between said tube and said conductive sleeve to create a dielectric barrier discharge plasma issuing from said gas passage.

2. An electric arc welding torch as defined in claim 1 wherein said frequency is greater than 500 hertz.

3. An electric arc welder as defined in claim 2 wherein said high frequency has a voltage in the general range of 1–40 kV.

4. An electric arc torch as defined in claim 3 wherein said passage has a gap width in the general range of 0.2–3.0 cm.

5. An electric arc torch as defined in claim 2 wherein said passage has a gap width in the general range of 0.2–3.0 cm.

6. An electric arc welder as defined in claim 2 wherein said passage has a gap width of about 0.3–0.5 cm.

7. An electric arc welding torch as defined in claim 1 wherein said frequency is greater than 18 kHz.

8. An electric arc welder as defined in claim 7 wherein said high frequency has a voltage in the general range of 1–40 kV.

9. An electric arc torch as defined in claim 7 wherein said passage has a gap width in the general range of 0.2–3.0 cm.

10. An electric arc welder as defined in claim 7 wherein said passage has a gap width of about 0.3–0.5 cm.

11. An electric arc welding torch as defined in claim 1 wherein said frequency is less than 2000 MHz.

12. An electric arc welder as defined in claim 11 wherein said high frequency has a voltage in the general range of 1–40 kV.

13. An electric arc welding torch as defined in claim 1 including a means for directing shield gas through said gas passage.

14. An electric arc welder as defined in claim 13 wherein said high frequency has a voltage in the general range of 1–40 kV.

15. An electric arc torch as defined in claim 13 wherein said passage has a gap width in the general range of 0.2–3.0 cm.

16. An electric arc welding torch as defined in claim 1 wherein said high frequency has an rms voltage greater than 1000 volts.

17. An electric arc welder as defined in claim 1 wherein said high frequency has a voltage in the general range of 1–40 kV.

18. An electric arc torch as defined in claim 17 wherein said passage has a gap width in the general range of 0.2–3.0 cm.

19. An electric arc torch as defined in claim 1 wherein said passage has a gap width in the general range of 0.2–3.0 cm.

20. An electric arc welder as defined in claim 1 wherein said passage has a gap width of about 0.3–0.5 cm.

21. An electric arc welding torch as defined in claim 1 wherein said dielectric sleeves are formed of a material selected from the class including ceramic, glass and polymer.

22. An electric arc welding torch as defined in claim 1 wherein said dielectric sleeves are formed of ceramic.

23. An electric arc welding torch as defined in claim 1 wherein at least one of said dielectric sleeves is formed of ceramic.

24. An electric arc welding torch comprising: concentric first and second electrode elements defining an annular shielding gas passageway between the outer cylindrical portion of the first electrode element and the inner cylindrical portion of said second electrode element and at least a cylindrical dielectric sleeve in said passageway to create a dielectric barrier discharge in said passageway when a high frequency voltage is applied across said electrode elements.

25. An electric arc welding torch as defined in claim 24 wherein said dielectric sleeve is mounted on said outer cylindrical portion of said first electrode element.

26. An electric arc welding torch as defined in claim 25 wherein said cylindrical dielectric sleeve is formed from a material selected from the class consisting of ceramic, glass and polymer.

27. An electric arc welding torch as defined in claim 24 wherein said dielectric sleeve is mounted on said inner cylindrical portion of said second electrode element.

28. An electric arc welding torch as defined in claim 27 wherein said cylindrical dielectric sleeve is formed from a material selected from the class consisting of ceramic, glass and polymer.

29. An electric arc welding torch as defined in claim 24 including two cylindrical dielectric sleeve in said passageway.

30. An electric arc welding torch as defined in claim 29 wherein at least one of said electrodes is formed of a wire mesh.

31. An electric arc welding torch as defined in claim 24 wherein said cylindrical dielectric sleeve is affixed to said outer cylindrical portion of said first electrode element and including a second cylindrical dielectric sleeve affixed to said inner cylindrical portion of said second electrode element.

32. An electric arc welding torch as defined in claim 31 wherein at least one of said electrodes is formed of a wire mesh.

33. An electric arc welding torch as defined in claim 32 wherein said first cylindrical electrode is a contact tube through which a welding wire is moved.

34. An electric arc welding torch as defined in claim 33 wherein said passageway has a gap for shielding gas and said gap has a width in the general range of 0.2–3.0 cm.

35. An electric arc welding torch as defined in claim 33 wherein said passageway has a gap and said gap has a width of about 0.3–0.5 cm.

36. An electric arc welding torch as defined in claim 31 wherein said first cylindrical electrode is a contact tube through which a welding wire is moved.

37. An electric arc welding torch as defined in claim 36 wherein said passageway has a gap for shielding gas and said gap has a width in the general range of 0.2–3.0 cm.

38. An electric arc welding torch as defined in claim 36 wherein said passageway has a gap and said gap has a width of about 0.3–0.5 cm.

39. An electric arc welding torch as defined in claim 31 wherein said passageway has a gap for shielding gas and said gap has a width in the general range of 0.2–3.0 cm.

40. An electric arc welding torch as defined in claim 31 wherein said passageway has a gap and said gap has a width of about 0.3–0.5 cm.

41. An electric arc welding torch as defined in claim 24 wherein at least one of said electrodes is formed of a wire mesh.

42. An electric arc welding torch as defined in claim 41 wherein said first cylindrical electrode is a contact tube through which a welding wire is moved.

43. An electric arc welding torch as defined in claim 42 wherein said passageway has a gap for shielding gas and said gap has a width in the general range of 0.2–3.0 cm.

44. An electric arc welding torch as defined in claim 42 wherein said passageway has a gap and said gap has a width of about 0.3–0.5 cm.

45. An electric arc welding torch as defined in claim 41 wherein said passageway has a gap for shielding gas and said gap has a width in the general range of 0.2–3.0 cm.

46. An electric arc welding torch as defined in claim 41 wherein said passageway has a gap and said gap has a width of about 0.3–0.5 cm.

47. An electric arc welding torch as defined in claim 41 wherein said cylindrical dielectric sleeve is formed from a material selected from the class consisting of ceramic, glass and polymer.

48. An electric arc welding torch as defined in claim 24 wherein said first cylindrical electrode is a contact tube through which a welding wire is moved.

49. An electric arc welding torch as defined in claim 48 wherein said passageway has a gap for shielding gas and said gap has a width in the general range of 0.2–3.0 cm.

50. An electric arc welding torch as defined in claim 48 wherein said passageway has a gap and said gap has a width of about 0.3–0.5 cm.

51. An electric arc welding torch as defined in claim 48 wherein said cylindrical dielectric sleeve is formed from a material selected from the class consisting of ceramic, glass and polymer.

52. An electric arc welding torch as defined in claim 24 wherein said passageway has a gap for shielding gas and said gap has a width in the general range of 0.2–3.0 cm.

53. An electric arc welding torch as defined in claim 52 wherein said cylindrical dielectric sleeve is formed from a material selected from the class consisting of ceramic, glass and polymer.

54. An electric arc welding torch as defined in claim 24 wherein said passageway has a gap and said gap has a width of about 0.3–0.5 cm.

55. An electric arc welding torch as defined in claim 54 wherein said cylindrical dielectric sleeve is formed from a material selected from the class consisting of ceramic, glass and polymer.

56. An electric arc welding torch as defined in claim 24 wherein said cylindrical dielectric sleeve is formed from a material selected from the class consisting of ceramic, glass and polymer.

57. A method of electric arc welding comprising:
   (a) providing a welding electrode;
   (b) creating an arc between said welding electrode and a workpiece; and,
   (c) surrounding said arc with a plasma,
   wherein said plasma is created by a dielectric barrier discharge.

58. A method as defined in claim 57 including:
   (d) providing said welding electrode as a welding wire; and,
   (e) moving said welding wire toward said workpiece.

59. A method as defined in claim 58 wherein said plasma is formed from arc shielding gas.

60. A method as defined in claim 57 wherein said plasma is formed from arc shielding gas.

61. A method as defined in claim 57 including:
   (d) providing said welding electrode as a welding wire; and,
   (e) moving said welding wire toward said workpiece.

62. A method as defined in claim 61 wherein said plasma is formed from arc shielding gas.

63. A method as defined in claim 57 wherein said plasma is formed from arc shielding gas.

* * * * *